United States Patent [19]

Terada et al.

[11] Patent Number: 5,014,554

[45] Date of Patent: May 14, 1991

[54] ANGULAR RATE SENSOR

[75] Inventors: Jiro Terada; Kazumitsu Ueda, both of Osaka; Hiroshi Takenaka, Ikoma; Mikio Nozu, Yamatokoriyama; Hiroshi Senda, Osaka; Yasuhito Osada, Kyoto; Toshihiko Ichinose; Takahiro Manabe, both of Osaka, all of Japan

[73] Assignee: Matsushita Electric Industrial Co., Ltd., Japan

[21] Appl. No.: 508,639

[22] Filed: Apr. 13, 1990

[30] Foreign Application Priority Data

Apr. 14, 1989 [JP] Japan .................................. 1-95720
May 19, 1989 [JP] Japan .................................. 1-126968

[51] Int. Cl.$^5$ .......................... G01C 19/56; G01P 9/04
[52] U.S. Cl. ...................................... 73/505; 73/526; 310/370
[58] Field of Search ................. 73/505, 526; 310/327, 310/329, 370

[56] References Cited

U.S. PATENT DOCUMENTS 2,544,646  3/1951  Barnaby et al. ..................... 264/1
4,628,734  12/1986  Watson .............................. 73/505
4,671,112  6/1987  Kimura et al. ...................... 73/505

FOREIGN PATENT DOCUMENTS 60-216210  10/1985  Japan .
0188908  8/1987  Japan ................................. 73/505

Primary Examiner—Hezron E. Williams
Assistant Examiner—Craig Miller
Attorney, Agent, or Firm—Lowe, Price, LeBlanc, Becker & Shur

[57] ABSTRACT

An angular rate sensor has a tuning fork structure composed of vibratory components. The vibratory components include piezoelectric drive and detection elements which are joined together into a tuning fork configuration, the drive and detection elements lying in respective orthogonal planes. Leads are electrically connected to the drive and detection elements, and lead terminals are electrically connected to the leads, respectively. The vibratory components are covered with a coating which is of a material having a lower elasticity than the elasticities of the vibratory components. The coating on the vibratory components effectively reduces the propagation of unwanted vibrations, thereby reducing output signal drifts.

3 Claims, 5 Drawing Sheets

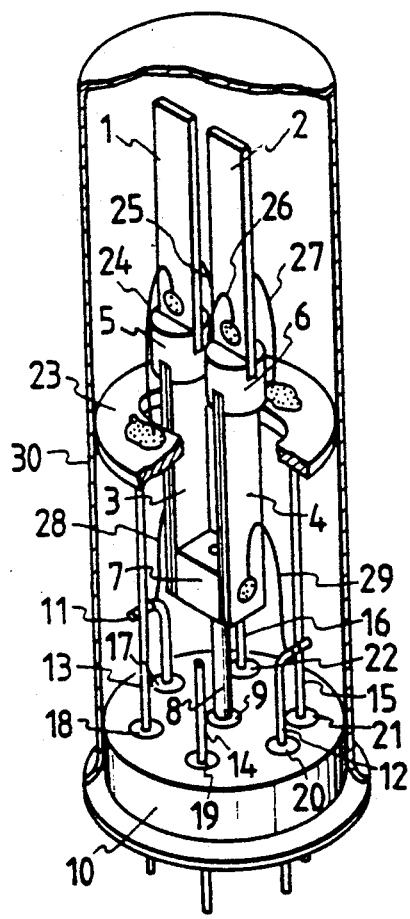
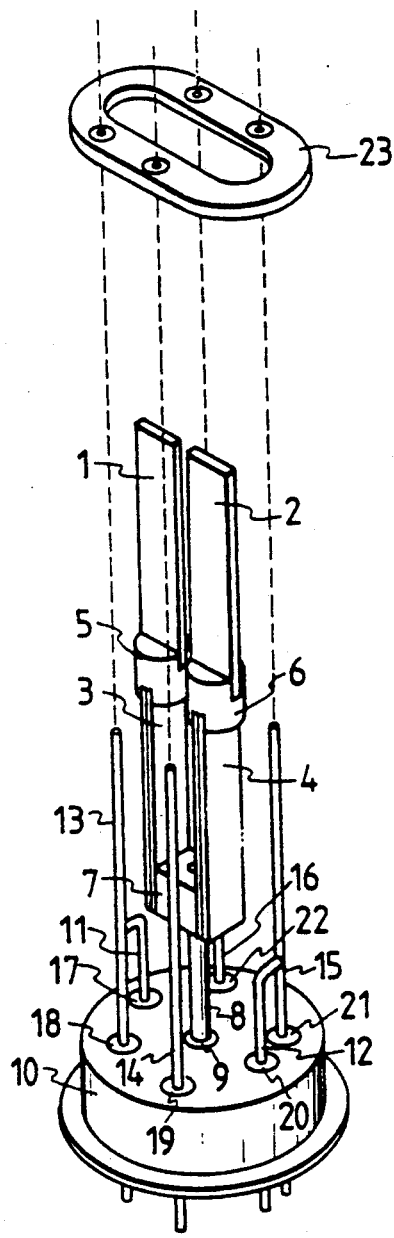

ANGULAR RATE SENSOR

BACKGROUND OF THE INVENTION

1. Field of the Invention

The present invention relates to an angular rate sensor for use in a gyroscope or the like.

2. Description of the Prior Art

The recent computer technology development has resulted in various computerized commercial products with many functions. There has been a growing demand for various sensors for use with such computer-controlled devices. Among these sensors is an angular rate sensor which finds a wide variety of applications such as electronic navigation systems, bearing detectors for robots, stabilizers for actuators, or the like. Angular rate sensors will be required to be smaller in size and yet have higher performance accuracy.

Heretofore, inertial navigation systems with gyroscopes have mainly been used to perform dead reckoning, i.e., to determine the position of a moving object such as an airplane or a ship. While the gyroscopic inertial navigation systems can determine stable dead reckoning positions, they are large in size and highly costly because they are mechanical in nature. Therefore, they cannot be applied to consumer equipment which should be relatively small in size and low in cost.

There has been proposed a vibratory gyro as disclosed in Japanese Patent Application No. 59-55420. According to the disclosed vibratory gyro, a mass is vibrated without any spinning force being applied thereto, and an angular rate of the mass is detected on the basis of Coriolis force which is produced when the angular rate is developed. The disclosed vibratory gyro may be regarded as a vibration sensor having a tuning-fork structure. The principles of the vibratory gyro are disclosed in U.S. Pat. No. 2,544,646.

According to the principles disclosed in U.S. Pat. No. 2,544,646, a rectangular elastic drive (excitation) element and a rectangular elastic detection element are linearly joined to each other, the drive and detection elements lying orthogonally to each other. When the detection element is vibrated at a velocity (V), a force, known as the Coriolis force, acts on the detection element and is detected to determine an angular rate of the detection element.

FIG. 1 of the accompanying drawings illustrates one conventional angular rate sensor and a drive circuit arrangement for the angular rate sensor. The angular rate sensor includes a pair of parallel piezoelectric bimorph drive elements 103, 104 and a pair of parallel piezoelectric bimorph detection elements 101, 102. The drive and detection elements 103, 101 and the drive and detection elements 104, 102 are joined by respective joint members 105, 106 parallel to a nodal axis and lie in orthogonal planes. The drive elements 103, 104 have lower ends joined to each other by a support 107. Thus, the angular rate sensor is in the form of a tuning-fork vibratory device. The vibratory device is resiliently mounted on a base 109 by a metallic elastic member 108 which is joined to the support 107. In operation, the drive elements 103, 104 are vibrated as a turning fork, and when an angular rate is developed on the detection elements 101, 102, an output signal indicative of the angular rate is produced.

The drive circuit for the angular rate sensor operates as follows: When a drive signal is applied from a driving circuit 115 to the drive element 103 to vibrate the same, the other drive element 104 resonates with the drive element 103. Therefore, the drive elements 103, 104 start tuning fork vibration. An amplitude signal from the drive element 104 is detected as a monitor output signal by a driving information extracting circuit 112. The monitor output signal is compared with a reference voltage 113 by an automatic gain control circuit 114, which feeds back its output signal to the driving circuit 115, thereby maintaining the amplitude of the tuning fork vibration at a constant level.

Utilizing a phase signal from the drive element 103, the detection elements 101, 102 produce a sense output signal, which is detected by a detecting circuit 110 in synchronism with a drive phase signal from the driving information extracting circuit 112. An output signal from the detecting circuit 110 is applied to a filter 111 by which an angular rate signal is extracted. In this manner, an angular rate force applied to the angular rate sensor is detected.

Because of irregularities of dimensional accuracy and element uniformity, unwanted spurious radiations or emissions are developed when the vibration is transmitted from the drive elements 103, 104 to the detection elements 101, 102. Leads connected to the detection elements 101, 102 and supports for the leads tend to develop parasitic oscillations and higher-order oscillations. If the tuning fork vibration is not properly balanced, then undesired vibrations are developed in the entire tuning-fork gyro angular rate sensor. As a consequence, the output signal of the angular rate sensor is subjected to drifts as shown in FIG. 2. The drift characteristic, which is one of the important performance factors of the angular rate sensor, is therefore adversely affected.

Besides the irregularities of dimensional accuracy and element uniformity, the structural characteristics of the angular rate sensor itself are also responsible for the generation and propagation of unwanted small vibrations, and hence for output signal drifts. Therefore, it has been difficult for the conventional vibratory-gyro angular rate sensor to detect angular rates with higher accuracy owing to its own dimensional and structural limitations.

SUMMARY OF THE INVENTION

It is an object of the present invention to provide a low-drift angular rate sensor in the form of a small-size vibratory gyro with no spinning force applied to its elements, the angular rate sensor being capable of reducing output signal drifts which would otherwise be caused by the generation and propagation of unwanted oscillations.

According to the present invention, there is provided an angular rate sensor comprising a tuning fork structure composed of vibratory components which include piezoelectric drive elements and piezoelectric detection elements, which are joined together into a tuning fork configuration, the drive and detection elements lying in orthogonal planes. A plurality of leads electrically connected to the drive and detection elements, and a plurality of lead terminals electrically connected to the leads, respectively. The vibratory components are covered with a coating which is of a material having a lower elasticity than the elasticities of the vibratory components.

The coating on the vibratory components is effective in absorbing or blocking unwanted vibrations caused by the generation, propagation, and reflection of small oscillations in the tuning fork structure. More specifically, unwanted vibrations which are developed by beat-frequency signals produced by coaction between the tuning fork vibration and unwanted vibrations, or unwanted signal components, are effectively absorbed or dampened by the interfaces between the coating and the vibratory components which have different moduli of elasticity. Therefore, the coating on the vibratory components serves as a filter for attenuating such unwanted vibrations. As a result, the angular rate sensor according to the present invention produces output signals with low drifts.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a perspective view, partly cut away, of a vibratory-gyro angular rate sensor according to the present invention;

FIG. 4 is an exploded perspective view of certain components of the angular rate sensor shown in FIG. 3, showing the manner in which the angular rate sensor is assembled;

DETAILED DESCRIPTION

1st Embodiment

Figure 1:
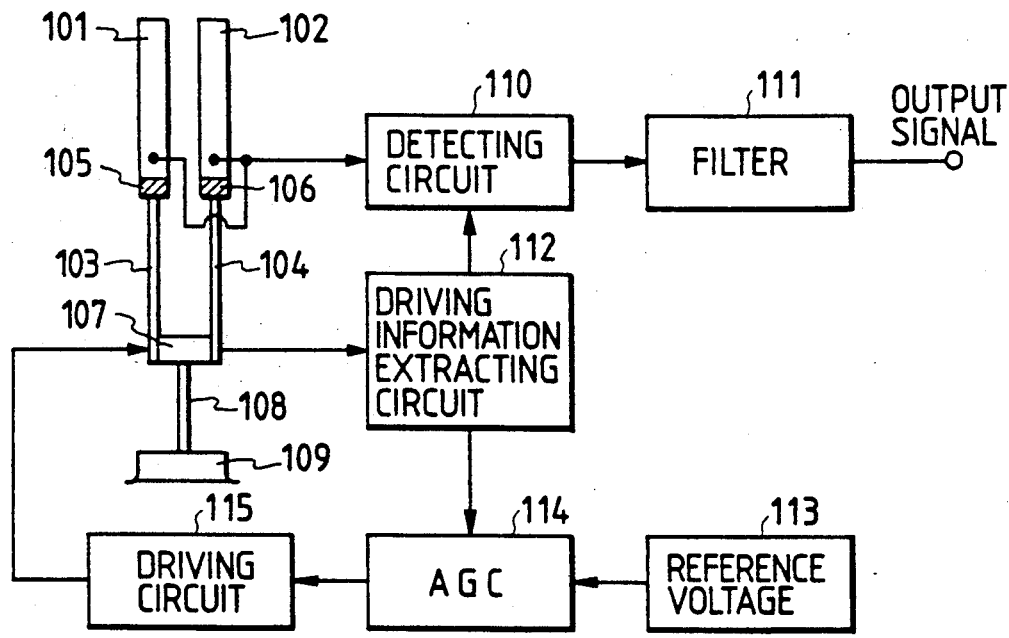
FIG. 1 is a prior art block diagram showing the principles of operation of a vibratory-gyro angular rate sensor.
Figure 2:
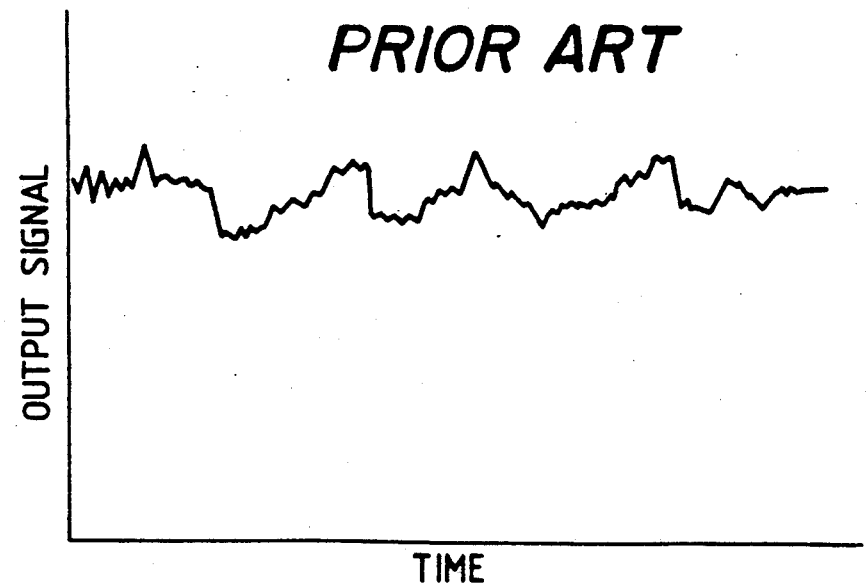
FIG. 2 is a graph illustrative of output signal drifts of the angular rate sensor of FIG. 1.

FIGS. 3 and 4 show the structure of a vibratory-gyro angular rate sensor according to a first embodiment of the present invention.

As shown in FIG. 4, the angular rate sensor comprises a pair of parallel piezoelectric bimorph vibration elements 1, 2 in the form of rectangular strips and a pair the form of rectangular strips. The vibration elements 1, 3, referred to as detection and drive elements, respectively, are linearly joined, end to end, to each other by an insulating joint 5 and lie in orthogonal planes, respectively. Similarly, the vibration elements 2, 4 are linearly joined, end to end, to each other by an insulating joint 6 and lie in orthogonal planes, respectively. Each of the vibration elements 1, 2, 3, 4 is made of a piezoelectric material composed mainly of Pb(Mg ⅓ Nb 2/3)O$_3$ (pseudocubic), which represents a metal oxide of one Pb, one third Mg, and two thirds Nb, PbTiO$_3$, (tetragonal), and PbZrO$_3$ (rhombohedral).

Each of the detection elements 1, 2 is of a rectangular shape having a length of 9 mm, a width of 1.6 mm, and a thickness of 0.35 mm. Each of the drive elements 3, 4 is also of a rectangular shape having a length of 9 mm, a width of 1.6 mm, and a thickness of 0.50 mm. Each of the insulating joints 5, 6 is made of polyamide plastics, and has a cylindrical configuration whose diameter is 1.6 mm. The insulating joints 5, 6 have orthogonal recesses defined diametrically in their axial ends. Confronting ends of the elements 1, 2, 3, 4 are received and bonded in the recesses in the insulating joints 5, 6 such that the detection and drive elements 1, 3 lie in respective orthogonal planes and the detection and drive elements 2, 4 lie in respective orthogonal planes.

The linear assembly of the elements 1, 3 and the joint 5 and the linear assembly of the elements 2, 4 and the joint 6 are electrically conductively joined to an electrical conductive connector 7, so that the joined assemblies and the connector 7 assume the shape of a tuning fork. The connector 7 comprises a block of brass having a length of 1.9 mm, a width of 1.6 mm, and a thickness of 1.6 mm, with a central hole, 0.6 mm across, being defined in the block. The conductive connector 7 is disposed between the drive elements 3, 4 and electrically and mechanically coupled to inner electrodes of the drive elements 3, 4.

Lead terminals 8, 11, 12, 13, 14, 15, 16 for electrical connection to the vibratory elements 1, 2, 3, 4 extend through and are secured to a support base 10 made mainly of iron with insulating members 9, 17, 18, 19, 20, 21, 22 of grass being disposed around the lead terminals 8, 11, 12, 13, 14, 15, 16, respectively, in the support base 10. The lead terminals 8, 11, 12, 13, 14, 15 have respective outer ends for electric connection to external circuits. The lead terminal 8 is bonded and fixedly mounted in a central hole defined in the connector 7.

A relay board 23 is supported on the inner ends of the lead terminals 13, 14, 15, 16 which are to be electrically connected to the detection elements 1, 2.

FIG. 3 shows the assembled angular rate sensor with its components encased in a bottomed cylindrical case 30.

The relay board 23 is of an annular shape and extends around the drive elements 3, 4. The relay board 23 is made of phenol and has an outside diameter of 7.5 mm and a thickness of 0.6 mm. The relay board 23 has four through holes in which the inner ends of the lead terminals 13, 14, 15, 16 are received from below. The relay board 23 has a copper foil on its upper surface, except the four holes, and the upper ends of the lead terminals 13, 14, 15, 16 inserted in the respective four holes are soldered to the copper foil. Therefore, the relay board 23 is fixedly held on the lead terminals 13, 14, 15, 16.

The detecting element 1 and the lead terminals 13, 16 are electrically connected to each other by leads 24, 25 whose opposite ends are soldered to the detecting element 1 and the lead terminals 13, 16. Likewise, the detecting element 2 and the lead terminals 14, 15 are electrically connected to each other by leads 26, 27 whose opposite ends are soldered to the detecting element 2 and the lead terminals 14, 15.

An outer electrode of the drive element 4 and an L-shaped inner end of the lead terminal 12 are electrically connected to each other by a soldered lead 29. Similarly, an outer electrode of the drive element 3 and an L-shaped inner end of the lead terminal 11 are electrically connected to each other by a soldered lead 28.

Figure 5:
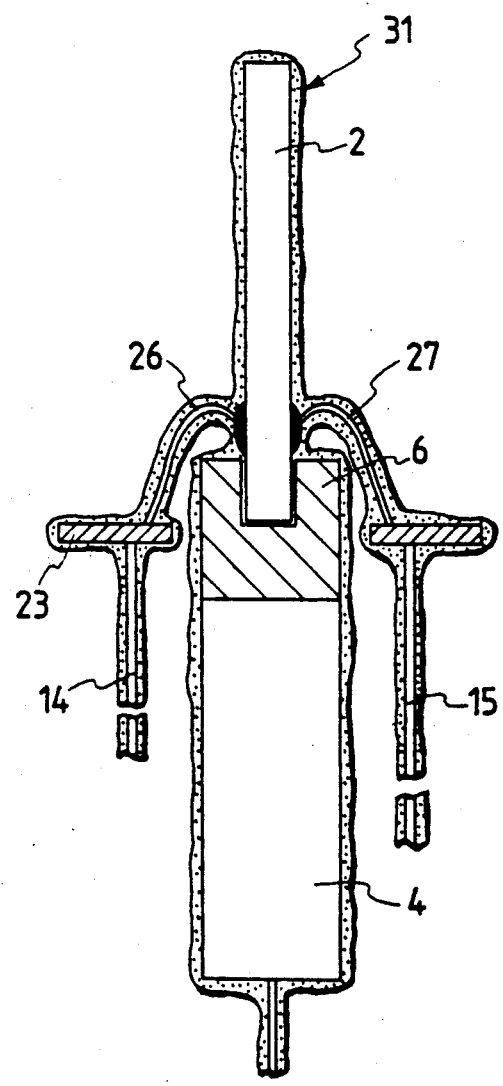
FIG. 5 is a sectional elevational view showing drive and detection elements which are encased in a coating.

According to the present invention, as shown in FIG. 5, at least the vibratory components of the tuning-fork structure of the angular rate sensor are covered with a coating 31 of a material whose elasticity is lower than that of the components of the tuning-fork structure.

The vibratory components of the tuning-fork structure include the detection elements 1, 2, the drive elements 3, 4, the insulating joints 5, 6, the leads 24 through 29, the lead terminals 8, 11 through 16, and the support base 10. Since the entire components of the tuning-fork structure are subject to small vibrations due to propagation of vibrations, all the vibratory components of the tuning-fork structure are covered with the coating 31 according to the present invention. However, the other parts of the tuning-fork structure which are not the vibratory components may also be covered with the coating 31.

Materials which are available of the coating 31 and which are less elastic than the components of the tuning-fork structure include silicone rubber, polyurethane rubber, and silicone varnish. Three Examples of angular rate sensors which employed the above three materials as the coating 31 will be described below. In each of Examples, the leads and the other components were covered with the coating.

In Example 1, only the leads 24, 25, 26, 27, 28, 29 were fully coated with a paste of silicone rubber by the vacuum impregnation. Thereafter, the coating was dried with heat.

In Example 2, all the components except the leads 24, 25, 26, 27, 28, 29 and the support base 10 were coated with a paste of silicone rubber by the vacuum impregnation, and thereafter the coating was dried with heat.

In Example 3, all the components except the support base 10 were coated with a paste of silicone rubber by the vacuum impregnation, and thereafter the coating was dried with heat.

Similarly, the components were coated with polyurethane rubber and silicone varnish in the same manner as with Examples 1, 2, 3. In Comparative Example, the vibratory components were not coated with a material of low elasticity. As a result, ten samples were prepared. In each of the samples, the coating had a thickness ranging from 5 to 100 $\mu$. The ten samples were sealed in respective cases 30 of iron having a diameter of 8.2 mm and a length of 28 mm. The bases 10 and the cases 30 were spot-welded to each other. Output signal drifts of the ten angular rate sensor samples (numbered by 1 through 10) are shown in Table 1 below:

TABLE 1

| Sample | Coating material | Coated components | Drift (dB) |
|---|---|---|---|
| 1 | Silicone rubber | Leads 24–27 | −20 |
| 2 | Silicone rubber | Parts except leads 24–27, base 10, and case 30 | −8 |
| 3 | Silicone rubber | Parts except base 10 and case 10 | −28 |
| 4 | Polyurethane rubber | Leads 24–27 | −19 |
| 5 | Polyurethane rubber | Parts except leads 24–27, base 10, and case 30 | −8 |
| 6 | Polyurethane rubber | Parts except base 10 and case 10 | −27 |
| 7 | Silicone varnish | Leads 24–27 | −22 |
| 8 | Silicone varnish | Parts except leads 24–27, base 10, and case 30 | −10 |
| 9 | Silicone varnish | Parts except base 10 and case 10 | −30 |
| 10 | None | Comparative Example | 0 |

The output signal drifts were measured using the drive circuit shown in FIG. 1, with the angular rate sensor being replaced with each of the angular rate sensor samples 1 through 10. The output signal drifts shown in Table 1 were expressed in the level of a voltage signal having a frequency ranging from 0.1 to 10 Hz, of the detected angular rate signal which was generated when the angular rate sensors were held at rest for 10 minutes and energized. When the output signal drift of the angular rate sensor sample 10 was assumed to be 0 dB, the output signal drifts of the angular rate sensor samples 1 through 9 were represented as voltage levels as compared with the output signal drift of 0 dB.

Table 1 indicates that the output signal drifts of the angular rate samples 1 through 9 in which the vibratory components such as the drive and detection elements, the insulating joints, the leads, the lead terminals, and the base were coated and impregnated with silicone rubber, polyurethane rubber, and silicone varnish, were −8 through −30 dB lower than the output signal drift of the comparative angular rate sensor sample 10 in which no components were coated with any coating material.

The output signal drifts of the angular rate sensor samples 1, 4, 7 in which the leads were coated were in a very low range, from −19 to −20 dB. This means that when the tuning fork vibration is propagated through the leads, unwanted drift signal components are attenuated or blocked by the coating of silicone rubber, polyurethane rubber, or silicone varnish which serves as a filter element. As a result, the drift signal components in the frequency range from 0.1 to 10 Hz are reduced to a degree which was −19 to −22 dB lower than the drift of the conventional angular rate sensor. Therefore, the angular rate sensor samples 1, 4, 7 achieved a sufficiently practical drift reduction.

The angular rate sensor samples 2, 5, 8 in which the components except the lead wires, the base, and the case were coated, reduced output signal drifts through the coating on the drive and detection elements, the insulating joints, the connector, and the lead terminals. The low-elasticity coating on the tuning-fork structure is effective in absorbing unwanted higher-order vibrations other than the fundamental vibration, thereby allowing the fundamental vibration of low distortion. Particularly, the coated lead terminals are capable of suppressing unwanted propagated vibrations. As a consequence, unwanted signal components are prevented from being applied to the detecting circuit. The output signal drifts of the angular rate sensor samples 2, 5, 8 were reduced by −8 through −10 dB.

The angular rate sensor samples 3, 6, 9 in which the components except the base and the case were coated were combinations of the angular rate sensor samples 1 and 2, 4 and 5, and 7 and 8. The output signal drifts of the angular rate sensor samples 3, 9, 9 were reduced to a large degree ranging from −27 to −30 dB, depending on the coating material used.

According to the present invention, wax, resin, rubber, or the like may also be employed as a low-elasticity material for coating the components of the angular rate sensor.

2nd Embodiment

When the ambient temperature of the angular rate sensor is subjected to a change, the detected signal (offset output voltage) of the angular rate greatly varies due to a thermal pyroelectric effect corresponding to the rate of change of the temperature. If a certain temperature change occurs slowly, i.e., with a small gradient or along a gentle sloping curve, then the offset output voltage of the detected signal of the angular rate sensor varies to a small extent. However, if the same temperature change is abruptly caused, i.e., in a stepwise manner, then the offset output voltage varies greatly. Therefore, the temperature-dependent output signal drift, which is another performance factor of the angular rate sensor, is largely affected by the pyroelectric effect of the piezoelectric material.

According to the pyroelectric effect, an electromotive force is generated by a piezoelectric material when it is irradiated with far-infrared radiation. Because of the pyroelectric effect, it has been difficult for the vibratory-gyro angular rate sensor to detect angular rates with higher accuracy.

The inventors have found that the tuning-fork structure of the angular rate sensor should be hermetically sealed in a gas under a pressure below one atmospheric pressure in order to avoid undesired temperature-dependent output signal drifts due to the pyroelectric effect.

More specifically, the pyroelectric effect is caused by electric charges which are generated in a piezoelectric material when it is subjected to a change in the temperature per unit time. According to the present invention, the tuning-fork structure including the drive and detection elements of the piezoelectric material is hermetically sealed in a gas under a pressure below one atmospheric pressure. The lower the pressure of the gas in which the tuning-fork structure is sealed, the lower the density of molecules of the gas. Thermal transfer from around the angular rate sensor to the tuning-fork structure is therefore reduced. As a result, unwanted electric charges are prevented from being generated in the piezoelectric material due to the pyroelectric effect.

The output angular rate signal produced by the angular rate sensor with its tuning-fork structure sealed in the gas has excellent temperature-dependent characteristics.

An angular rate sensor according to the second embodiment will be described in greater detail below.

The angular rate sensor according to the second embodiment has a tuning-fork structure which is the same as that of the angular rate sensor according to the first embodiment. The tuning-fork structure is housed in the case 30 of iron, and the case 30 and the base 10 are spot-welded to each other, with a gas being filled in the case 30.

Angular rate sensor samples 1 through 14 were prepared by filling air and nitrogen in the case 30 under a pressure ranging from 0.1 mmHg to 760 mmHg. Table 2 below shows the angular rate sensor samples 1 through 14.

TABLE 2

| Sample | Filled gas | Gas pressure (mmHg) |
| --- | --- | --- |
| 1 | Air | 760 |
| 2 | Air | 750 |
| 3 | Air | 200 |
| 4 | Air | 20 |
| 5 | Air | 2 |
| 6 | Air | 0.2 |
| 7 | Air | 0.1 |
| 8 | Nitrogen | 760 |
| 9 | Nitrogen | 750 |
| 10 | Nitrogen | 200 |
| 11 | Nitrogen | 20 |
| 12 | Nitrogen | 2 |
| 13 | Nitrogen | 0.2 |
| 14 | Nitrogen | 0.1 |

Figure 6:
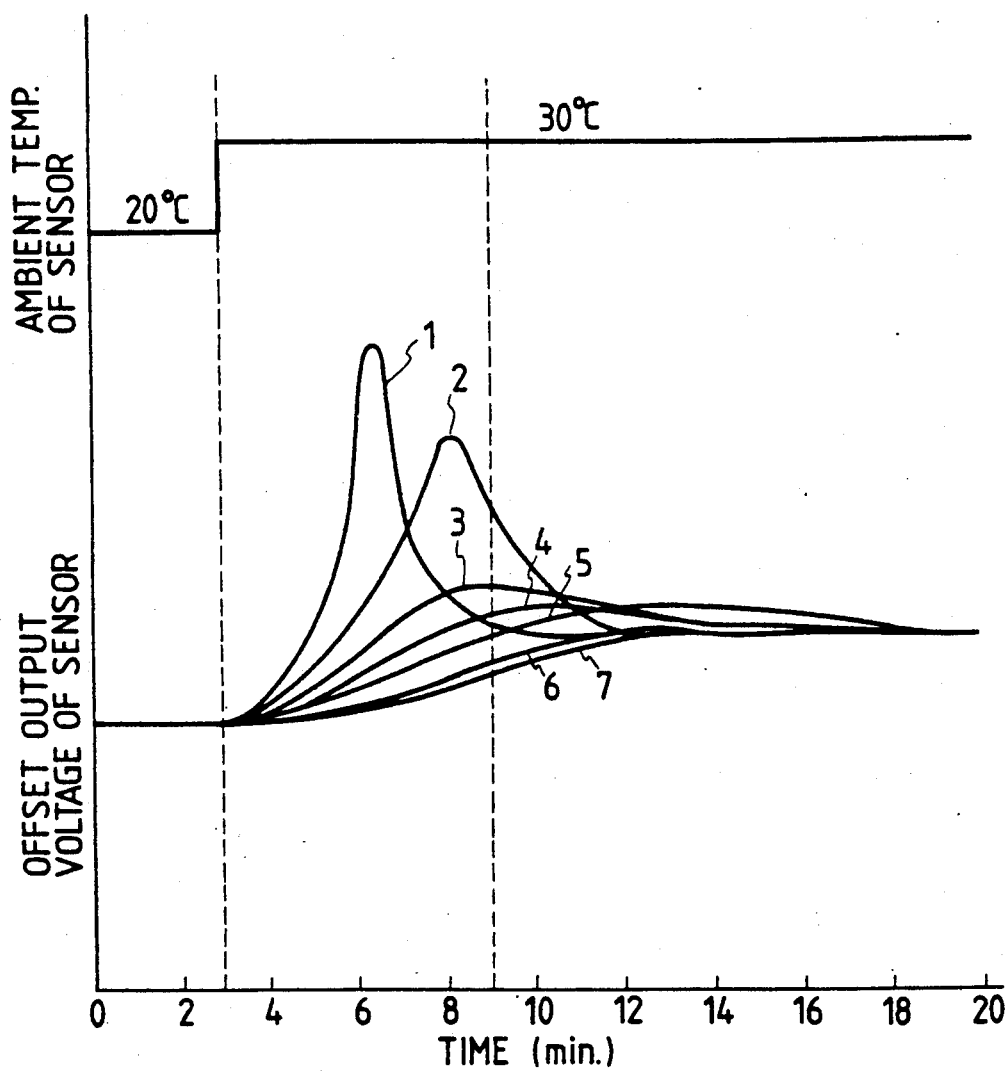
FIGS. 6 and 7 are graphs showing how the offset voltage of the angular rate sensor according to the present invention varies with temperature and time.
Figure 7:
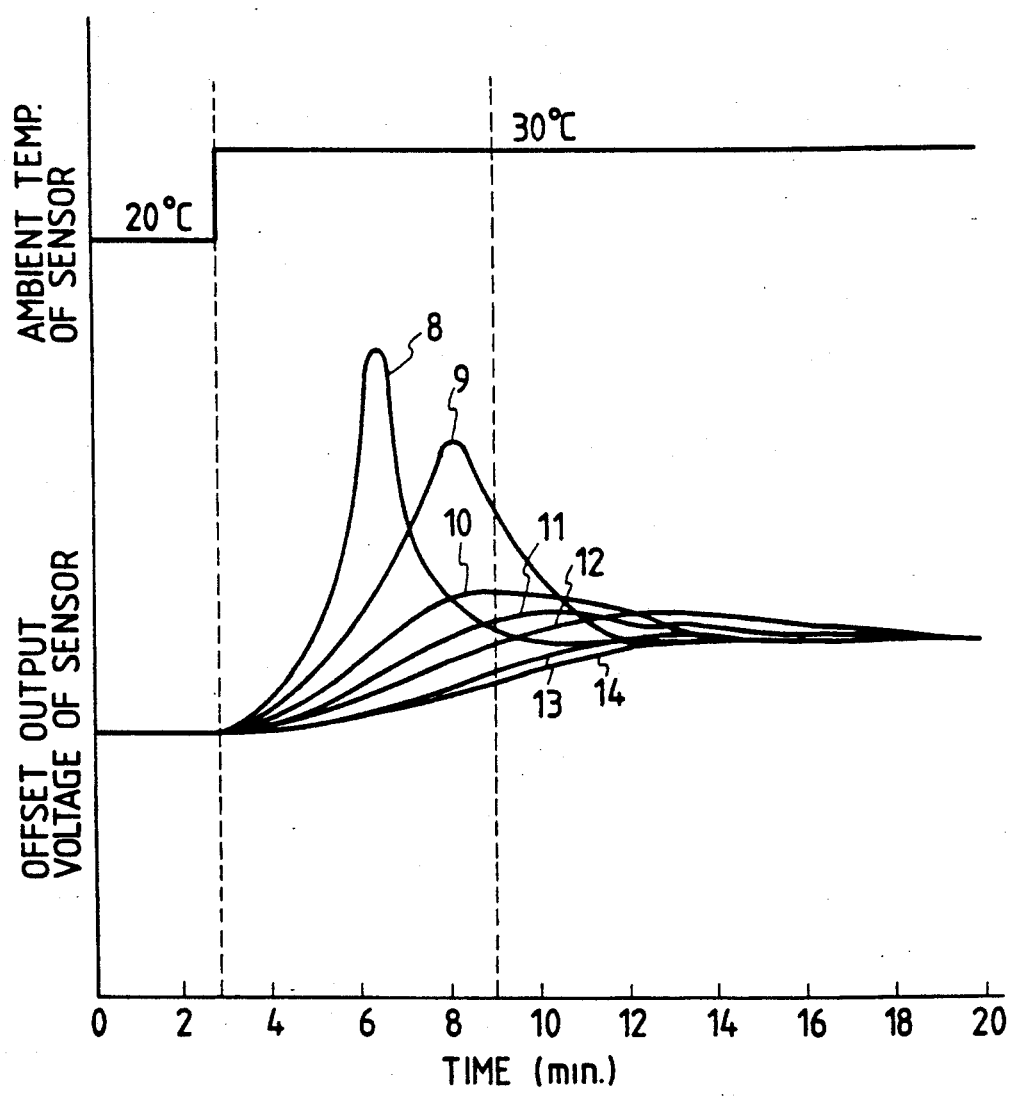

Variations in the offset output voltage were measured using the drive circuit shown in FIG. 1, with the angular rate sensor being replaced with each of the angular rate sensor samples 1 through 14. The angular rate sensor samples 1 through 14 were placed in a temperature-controlled bath, and the temperature of an atmosphere around the angular rate sensor samples 1 through 14 was varied from 20° C. to 30° C. FIGS. 6 and 7 show offset output voltages produced by the circuit shown in FIG. 1 when the temperature was thus varied.

FIG. 6 shows the offset output voltages of the angular rate sensor samples 1 through 7, whereas FIG. 7 shows the offset output voltages of the angular rate sensor samples 8 through 14.

Study of FIGS. 6 and 7 indicates that the changes in the offset output voltages are progressively smaller as the pressure of the filled gas is lower in the angular rate sensor samples 1 through 7 and 8 through 14. More specifically, when the temperature around the angular rate sensor undergoes a change, changes in the offset output voltage of the angular rate sensor become smaller as the pressure of the gas which seals the tuning-fork structure is lower than the normal pressure (one atmospheric pressure). The same results were obtained irrespective of whether the tuning-fork structure was sealed in air or nitrogen gas, as shown in FIGS. 6 and 7. The same results were also obtained when the gas pressure was lower than 0.1 mmHg.

Although certain preferred embodiments have been shown and described, it should be understood that many changes and modifications may be made therein without departing from the scope of the appended claims.

What is claimed is:

1. An angular rate sensor comprising a tuning fork structure composed of vibratory components which include:
    a pair of parallel piezoelectric drive elements;
    a pair of parallel piezoelectric detection elements;
    said drive elements and said detection elements being joined together into a tuning fork configuration, said drive and detection elements lying in respective orthogonal planes;
    a plurality of leads electrically connected to said drive and detection elements; and
    a plurality of lead terminals electrically connected to said leads, respectively;
    said vibratory components being covered with a coating which is of a material having a lower elasticity than the elasticities of the vibratory components.

2. An angular rate sensor according to claim 1, wherein said tuning fork structure is hermetically sealed in a gas under a pressure lower than one atmospheric pressure.

3. An angular rate sensor according to claim 1, wherein said material is selected from the group consisting of silicone rubber, polyurethane rubber, and silicone varnish.

* * * * *